April 6, 1926.

G. J. PAPASHVILI 1,579,241

LEVEL INDICATOR AND FUEL CONTROL

Filed July 21, 1924

INVENTOR
George J. Papashvili.
BY
Clayton E. Wyrick.
ATTORNEY

Patented Apr. 6, 1926.

1,579,241

UNITED STATES PATENT OFFICE.

GEORGE J. PAPASHVILI, OF DETROIT, MICHIGAN.

LEVEL INDICATOR AND FUEL CONTROL.

Application filed July 21, 1924. Serial No. 727,181.

*To all whom it may concern:*

Be it known that I, GEORGE J. PAPASHVILI, a citizen of Russia, and residing at Detroit, county of Wayne, State of Michigan, have invented a new and Improved Level Indicator and Fuel Control, of which the following is a specification.

This invention relates to low level indicators and fuel control and has for one of its objects the provision of a device particularly adapted to furnish an automatic indication or warning when the level of lubricant in an engine crank-case or other lubricant reservoir falls dangerously low.

Another object of the invention is to indicate the existence of a dangerously low level of lubricant in an engine crank-case (or the like) by automatically cutting off the explosive mixture supply to the engine under such conditions.

Still another object is to provide an automatic indicating device of the described character which will utilize the movement of an actuating member shifting with the gradual variations of level in a liquid reservoir to effect an abrupt or snap movement of an actuated part in certain limiting positions of the first mentioned element.

These and various other objects the invention attains by means of the construction, etc.

Figure 1:
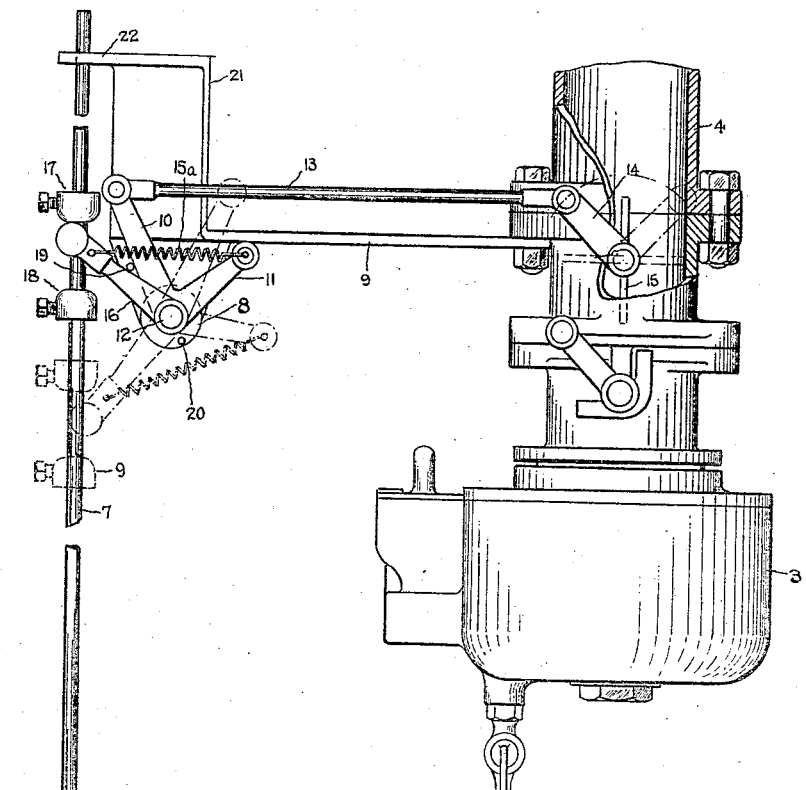
Figure 1 is a view in elevation showing the device used to automatically control a throttle in the mixture supply pipe of an engine.
Figure 2:
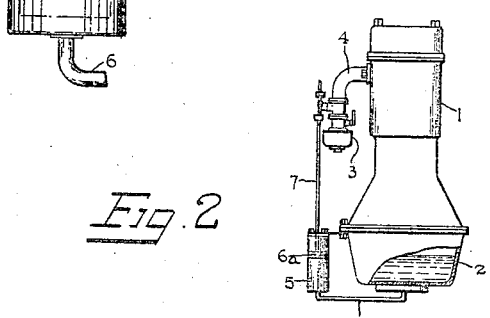
Figure 2 is a diagrammatic view showing said device and completely showing said engine.

In these views the reference character 1 designates an internal combustion engine having its crank-case 2 forming, as is common practice, a lubricant reservoir. 3 is the carburetor of said engine and 4 a pipe for delivering the explosive mixture from said carburetor to the engine.

The engine provides a float chamber 5 connected at its lower end and to the crankcase by a pipe 6 and so positioned as to maintain the same level or lubricant therein as in said crank-case. 6ᵃ is a float arranged within the chamber 5 to rise and fall with the varying liquid level therein and 7 is a stem secured to said float and slidably passing through the top of the chamber 5.

Said stem projects upwardly some distance above the chamber 5 passing adjacent to a bracket 8 carried by the outer end of an arm 9 which is mounted fast upon the pipe 4. Upon said bracket a bell-crank comprising arms 10 and 11 is pivoted as indicated at 12. From the arm 10 a swinging link bar 13 extends to an arm 14 secured to the stem of a throttle 15 disposed within and controlling the flow through the pipe 4.

From the arm 11 a coiled spring 15ᵃ extends to the free end portion of an arm 16 which is loosely mounted upon the pivot pin 12. Terminally, the arm 16 projects adjacent the stem 7, between a pair of collars 17 and 18 clamped adjustably on said stem.

19 is a pin upon the bracket 8 which forms a stop, limiting swinging travel of the two arms 10 and 16 toward each other. 20 is a pin acting as a stop, limiting swinging of the arms 11 and 16 toward each other.

In the operation of the described invention, under normal operating conditions, the throttle 15 is open fully and the parts occupy the positions shown in full lines in Figure 1.

As the float 6ᵃ lowers with the gradually lowering lubricant level in the chamber 5 and crank-case 2, the uppermost collar 17 carries the arm 16 angularly downward toward its dash line position. When the crank-case is almost empty, said arm passes below the longitudinal center line of the arm 11. Thereupon, the spring 15ᵃ which has been urging the bell crank 10, 11 against the pin 19 reverses its effect upon the bell-crank and abruptly swings the latter to its dash line position, thereby establishing the closed position of the throttle 15, as is also shown in dash line in Figure 1.

The engine 1 being thus deprived of fuel will at once cease to operate and will remain inoperative until the operator has replenished the supply of lubricant in the crank-case 2. When this is done, the rising level of lubricant in the chamber 5 will carry the float 6ᵃ to its raised limiting position, the stem 7 and collars 17 and 18 rising with said float. The lowermost collar 18, while thus rising, will swing the arm 16 upwardly and when said arm has swung beyond the center line of the bell-crank arm 11, the spring 15ᵃ will reverse the effort exerted upon the bell-crank and will abruptly move the latter from its dash line to its full line position, as seen in Figure 1.

When said bell-crank is in said full line position, the pin 19 establishes limiting positions of both said bell-crank and the arm 16, and similarly when the parts occupy the positions shown in dash lines, the pin 20 limits response of the bell-crank and of the arm 16 to said spring.

Preferably the bracket 8 has an upwardly projecting portion 21 with a lug 22 extending therefrom to guide the upper portion of the stem 7.

The described invention not only provides a positive indication to a vehicle operator of a dangerously low lubricant lever in the engine crank-case, but automatically stops operation of the engine under such conditions so that damage may not result due to failure of lubricant. Thus even if the engine of a motor vehicle is running without attention at the time that the lubricant level reaches the danger point, the engine will not suffer damage owing to the automatic functioning of the described device.

From the foregoing it becomes evident that the device is very simple and efficient, operates automatically, will not easily get out of order and provides a device which accomplishes the objects described.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having thus described my invention, I claim:

1. In a device of the character described, the combination with an internal combustion engine, of a reservoir supplying lubricant to said engine, a throttle controlling the delivery of fuel to said engine, a float arranged to rise and fall with variations in the lubricant level in said reservoir and means for abruptly shifting said throttle to its open or closed position according as said float is in a predetermined raised or lowered position.

2. In a device of the character described, the combination with an internal combustion engine, of a reservoir supplying lubricant to said engine, a throttle controlling the fuel supply to said engine, a float chamber adjacent and connected to said reservoir, a float arranged to rise and fall with the varying lubricant level in said float chamber, a stem secured to said float and extending upwardly from said chamber, a pair of collars fast upon said stem, a pivotal arm projecting at its free end between said rollers, a bell-crank co-pivotal with said arm, an actuating connection from one arm of said bell-crank to said throttle, and a spring extending from the first named arm to the other arm of said bell-crank.

3. In a device of the character described, the combination with an internal combustion engine, of a reservoir supplying lubricant to said engine, a throttle controlling the delivery of fuel to said engine, a float adapted to rise and fall with the varying level of lubricant in said reservoir, a substantially vertical stem connected to said float, a pivotal member adjacent said stem, an actuating connection from said pivotal member to the throttle, an arm co-pivotal with said member, movable independently of the latter, means carried by said stem engageable with said arm to swing the latter upwardly and downwardly as the stem raises and lowers, and a coiled spring connecting said arm and pivotal member and movable across the pivot of said member by the vertical travel of said stem to reverse the effort exerted by said spring upon the pivotal member.

In witness whereof I hereunto set my hand.

GEORGE J. PAPASHVILI.